United States Patent
Ohtsuka et al.

(10) Patent No.: US 6,341,139 B1
(45) Date of Patent: Jan. 22, 2002

(54) SEMICONDUCTOR-LASER-PUMPED SOLID STATE LASER

(75) Inventors: Hisashi Ohtsuka; Yoji Okazaki, both of Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/299,656

(22) Filed: Apr. 27, 1999

(30) Foreign Application Priority Data

Apr. 28, 1998 (JP) .......................................... 10-118659

(51) Int. Cl.⁷ ................................................ H01S 3/17
(52) U.S. Cl. ........................ 372/107; 372/108; 372/103; 372/71; 372/34
(58) Field of Search ......................... 372/75, 71, 36, 372/34, 92, 22, 107, 103, 108

(56) References Cited

U.S. PATENT DOCUMENTS

| | | | |
|---|---|---|---|
| 4,656,635 A | | 4/1987 | Baer et al. ..................... 372/27 |
| 5,086,433 A | * | 2/1992 | Pocholle et al. ............... 372/75 |
| 5,287,381 A | * | 2/1994 | Hyuga et al. .................. 372/75 |
| 5,394,420 A | * | 2/1995 | Senh et al. .................... 372/92 |
| 5,848,092 A | * | 12/1998 | Mitsumoto et al. ........... 372/92 |
| 5,867,324 A | * | 2/1999 | Kmetec et al. ................ 372/71 |
| 5,943,353 A | * | 8/1999 | Kaneko ........................ 372/34 |
| 6,038,244 A | * | 3/2000 | Usui et al. .................... 372/75 |
| 6,049,558 A | * | 4/2000 | Harada et al. ............... 372/107 |

FOREIGN PATENT DOCUMENTS

| | | | |
|---|---|---|---|
| JP | 8-88428 | 4/1996 | ........... H01S/3/042 |
| JP | 8-213689 | 8/1996 | ............. H01S/3/16 |

* cited by examiner

*Primary Examiner*—Leon Scott, Jr.
(74) *Attorney, Agent, or Firm*—Sughrue Mion, PLLC

(57) ABSTRACT

A semiconductor-laser-pumped solid state laser includes a solid state laser medium doped with a rare earth element such as neodymium and a semiconductor laser which emits a pumping laser beam for pumping the solid state laser medium. A pumping light incident side end face of the solid state laser medium is fixed to a holder.

20 Claims, 3 Drawing Sheets

SEMICONDUCTOR-LASER-PUMPED SOLID STATE LASER

BACKGROUND OF THE INVENTION

1. Field of the Invention

This invention relates to a semiconductor-laser-pumped solid state laser in which a solid state laser medium is pumped by a semiconductor laser (laser diode), and more particularly to such a semiconductor-laser-pumped solid state laser in which heat dissipation from the solid state laser medium is enhanced.

2. Description of the Related Art

As disclosed, for instance, in Japanese Unexamined Patent Publication No. 62(1987)-189783, there has been known a semiconductor-laser-pumped solid state laser in which a solid state laser medium doped with a rare earth element such as neodymium is pumped by a laser beam produced by a semiconductor laser.

Recently, in such semiconductor-laser-pumped solid state lasers, there have been increasing demands toward miniaturization, increasing the output power and improving the beam quality (oscillation in single transverse mode). To meet these demands, use of a solid state laser medium higher in pumping beam absorption efficiency is required and the pumping laser beam is required to be higher in power and smaller in beam diameter.

Thus, use of $Nd:YVO_4$, Er:YAG, and the like which are high in pumping beam absorption efficiency has been considered. Further, it has become possible to expose the solid state laser medium to a pumping laser beam which is high in output power and small in beam diameter by virtue of increase in output per unit area of the semiconductor laser and improvement in light condensing technique, for instance, in a fiber coupling.

However attempts to meet the requirements on the solid state laser medium and the pumping laser beam often greatly increase the temperature of the solid state laser medium and give rise to a problem such as thermal breakdown, thermal lens or the like.

As a structure for promoting heat dissipation from the solid state laser medium, there has been known a structure disclosed in Japanese Unexamined Patent Publication No. 8(1996)-88428 in which the front end face of the solid state laser medium (the end face opposite to the pumping light incident side end face, i.e., the end face from which the pumping laser enters the solid state laser medium) is mounted on a holder which is formed of a material high in thermal conductivity such as copper and the holder is in contact with a cooling element by way of a heat transfer medium.

Further there have been proposed structures in which the front end face of the solid state laser medium is kept in a close contact with a cooling element by way of foil or a side face of the solid state laser medium is kept in contact with a heat sink, as disclosed for instance in Japanese Unexamined Patent Publication No. 8(1996)-213689.

However even with these structures, heat dissipation from the solid state laser medium is not sufficient and the problem of thermal lens and/or thermal breakdown cannot be avoided.

SUMMARY OF THE INVENTION

In view of the foregoing observations and description, the primary object of the present invention is to provide a semiconductor-laser-pumped solid state laser in which heat can be sufficiently dissipated from the solid state laser medium.

In accordance with a present invention, there is provided a semiconductor-laser-pumped solid state laser in which a solid state laser medium doped with a rare earth element such as neodymium is pumped by a laser beam produced by a semiconductor laser, wherein the improvement comprises that a pumping light incident side end face of the solid state laser medium is fixed to a holder.

It is preferred that the holder be provided with a through hole through which the pumping laser beam impinges upon the pumping light incident side end face of the solid state laser medium and the inside dimensions of the through hole change continuously or stepwise in the direction of thickness of the holder.

More specifically, it is preferred that the through hole is circular in cross-section and tapered toward the solid state laser medium to conform to the shape of the pumping laser beam which is substantially circular in cross-section and converges toward the solid state laser medium.

It is further preferred that the end face of the solid state laser medium opposite to the pumping light incident end face is in contact with a heat dissipation plate. Preferably the heat dissipation plate is directly in contact with a cooling element or in contact with a cooling element by way of a member which is high in heat conductivity.

Resonator mirrors and a polarization control element may also be fixed to the holder for holding the solid state laser medium and the temperature of the holder may be controlled by a cooling element so that the length of the resonator is kept constant. In this case, the cooling element may double as the cooling element which is in contact with the aforesaid heat dissipation plate.

It is preferred that the holder be of metal which is high in heat conductivity.

The arrangement of the present invention is more effective when $Nd:YVO_4$ or Er:YAG which are high in pumping beam absorption efficiency is used as the solid state laser medium.

We have found that the problem of thermal lens and/or thermal breakdown, which is apt to occur when a solid state laser medium high in pumping beam absorption efficiency is used or a high output small diameter pumping laser beam is used, is due to the following point.

These will be described hereinbelow. FIG. 6A shows a case where a pumping laser beam 2 which is relatively low in output and relatively large in divergent angle (large in beam diameter) enters a solid state laser medium 1 which is relatively low in pumping beam absorption efficiency.

FIG. 6B shows a case where a pumping laser beam 2' which is relatively high in output and relatively small in divergent angle (small in beam diameter) enters a solid state laser medium 1' which is relatively high in pumping beam absorption efficiency.

In FIGS. 6A and 6B, the hatched portions show main heat generating regions. In the former case (shown in FIG. 6A), heat is generated from a relatively wide area. To the contrast, in the latter case (shown in FIG. 6B), heat is generated from a limited area near the pumping laser beam incident end face and accordingly unless the generated heat is efficiently dissipated, the temperature of the solid state laser medium is greatly increased to cause the problem of thermal lens or thermal breakdown.

In the semiconductor-laser-pumped solid state laser in accordance with the present invention, since the pumping laser beam incident end face of the solid state laser medium is fixed to the holder, the generated heat can be well dissipated through the end face and the holder, whereby the temperature of the area near the pumping laser beam incident end face is prevented from being excessively elevated and the problem of thermal lens and/or thermal breakdown can be avoided.

When the holder is formed of metal which is high in heat conductivity, the generated heat can be better dissipated through the end face and the holder.

When the holder is provided with a through hole through which the pumping laser beam impinges upon the pumping light incident side end face of the solid state laser medium and the inside dimensions of the through hole change continuously or stepwise in the direction of thickness of the holder, the surface area of the wall portion circumscribing the through hole becomes larger than when the inside dimensions of the through hole are uniform in the direction of thickness of the holder, and heat dissipating effect is enhanced.

Further when the through hole is circular in cross-section and tapered toward the solid state laser medium to conform to the shape of the pumping laser beam which is substantially in cross-section and converges toward the solid state laser medium, the contact area between the solid state laser medium and the holder is wider and heat dissipating effect is further enhanced.

Further when the end face of the solid state laser medium opposite to the pumping light incident end face is in contact with a heat dissipation plate, heat dissipating effect is further enhanced.

When the heat dissipation plate is directly in contact with a cooling element or in contact with a cooling element by way of a member which is high in heat conductivity, heat dissipating effect is further more enhanced.

DESCRIPTION OF THE PREFERRED EMBODIMENTS

Figure 1:
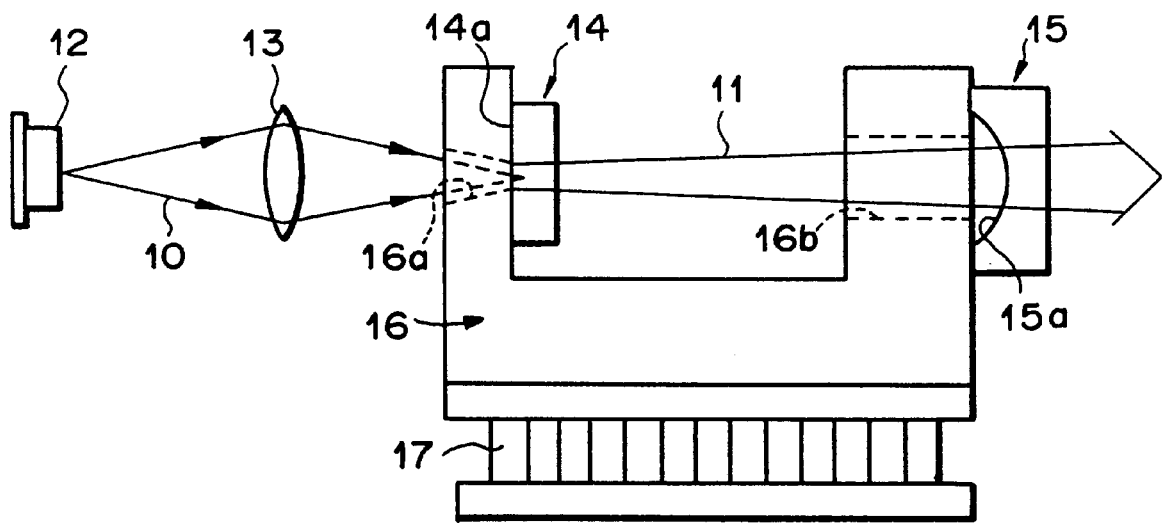
FIG. 1 is a schematic side view showing a semiconductor-laser-pumped solid state laser in accordance with a first embodiment of the present invention.

In FIG. 1, a semiconductor-laser-pumped solid state laser in accordance with a first embodiment of the present invention comprises a semiconductor laser 12 which produces a laser beam 10 as a pumping beam, a condenser lens 13 which condenses the laser beam 10, which is produced as divergent light, a Nd:YVO$_4$ crystal 14 which is a solid laser medium doped with neodymium (Nd), and a resonator mirror 15 disposed forward (the right side as seen in FIG. 1) of the Nd:YVO$_4$ crystal 14.

The Nd:YVO$_4$ crystal 14 and resonator mirror 15 are held by a holder 16, and the holder 16 is fixedly mounted on a cooling face (the upper face in FIG. 1) of a Peltier element 17. The Nd:YVO$_4$ crystal 14 is fixed to the holder 16, for instance, by bonding the pumping laser beam incident end face 14a thereof to the holder 16. Further the resonator mirror 15 is fixed to the holder 16, for instance, by bonding the rear end face to the holder 16 at the part outside the mirror surface 15a.

The holder 16 is formed of copper which is high in heat conductivity and is provided with a circular through hole 16a through which the pumping laser beam 10, which is circular in cross-section, impinges upon the pumping light incident side end face 14a of the Nd:YVO$_4$ crystal 14. Further the holder 16 is provided with a through hole 16b through which a laser beam 11 to be described later impinges upon the resonator mirror 15.

The semiconductor laser 12 produces a laser beam 10 having a wavelength of 809 nm. Neodymium ions in the Nd:YVO$_4$ crystal 14 are pumped by the laser beam 10 and the Nd:YVO$_4$ crystal 14 thereby produces a laser beam having a wavelength of 1064 nm.

The pumping light incident side end face 14a of the Nd:YVO$_4$ crystal 14 is provided with a coating which is highly transmissive (a transmittance of not lower than 99%) to light at 809 nm and highly reflecting (a reflectivity of not lower than 99.9%) to light at 1064 nm. The mirror surface 15a of the resonator mirror 15 is spherical and is provided with a coating which is highly reflecting to the pumping laser beam 10 and transmits a part of light at 1064 nm.

Thus the light beam of a wavelength of 1064 nm emitted from the Nd:YVO$_4$ crystal 14 is confined between the surfaces 14a and 15a and oscillates. The laser beam 11 thus produced is radiated from the resonator mirror 15.

As can be understood from the description above, the Nd:YVO$_4$ crystal 14 and the resonator mirror 15 form a resonator for a solid state laser. The temperature in the resonator is detected by a temperature sensor (not shown) and the Peltier element 17 is controlled on the basis of the output of the temperature sensor so that the holder 16 is kept at a predetermined temperature, whereby the length of the holder 16 as measured along the optical axis, that is, the length of the resonator, is kept constant at a predetermined length.

As described above, since the Nd:YVO$_4$ crystal 14 is apt to absorb the pumping laser beam 10 and the pumping laser beam 10 impinges upon the Nd:YV0$_4$ crystal 14 with its diameter narrowed, heat is generated in a localized area near the pumping light incident end face 14a of the Nd:YVO$_4$ crystal 14.

However in this embodiment, since the pumping light incident end face 14a of the Nd:YVO$_4$ crystal 14 is fixed to the holder 16 which is cooled by the Peltier element 17, heat is well dissipated through the holder 16, and the temperature of the area near the pumping light incident end face 14a is prevented from being excessively elevated and the problem of thermal lens and thermal breakdown can be avoided.

Especially since the holder 16 is formed of copper which is high in heat conductivity in this particular embodiment, heat dissipation effect is further more enhanced.

Figure 2:
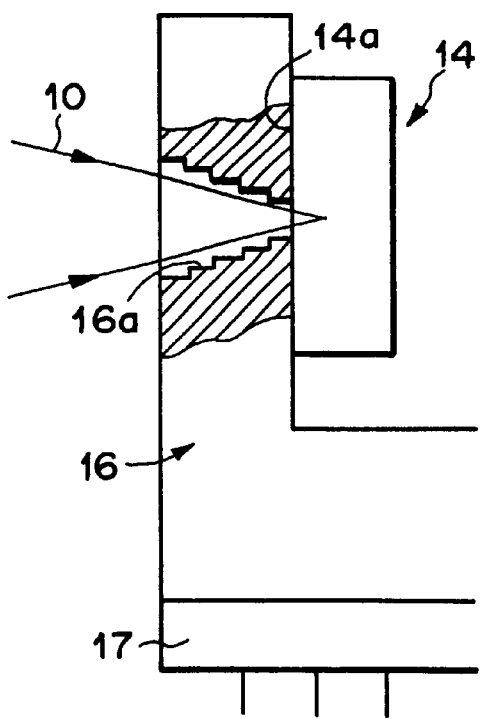
FIG. 2 is a fragmentary enlarged view partly cut away showing a part of the semiconductor-laser-pumped solid state laser.

Further as clearly shown in FIG. 2, the through hole 16a through which the pumping laser beam 10 impinges upon the Nd:YVO$_4$ crystal 14 is shaped so that the inside dimensions (inner diameter) of the through hole 16a change stepwise in the direction of thickness of the holder 16. With this arrangement, the surface area of the wall portion circumscribing the through hole 16a becomes larger than when the inside dimensions of the through hole are uniform in the direction of thickness of the holder 16, and heat dissipating effect is enhanced.

Further since the through hole 16a is circular in cross-section and the inner diameter of the through hole 16a is reduced stepwise toward the Nd:YVO$_4$ crystal 14 to conform to the shape of the pumping laser beam 10 which is substantially circular in cross-section and converges toward the Nd:YVO$_4$ crystal 14, the contact area between the Nd:YVO$_4$ crystal 14 and the holder 16 is wider and heat dissipating effect is further enhanced.

The through hole 16a need not strictly conform to the shape of the pumping laser beam 10 provided that the inner diameter of the through hole 16a changes in the direction of thickness of the holder 16. Further the through hole 16a may be tapered toward the Nd:YVO$_4$ crystal 14.

Figure 3:
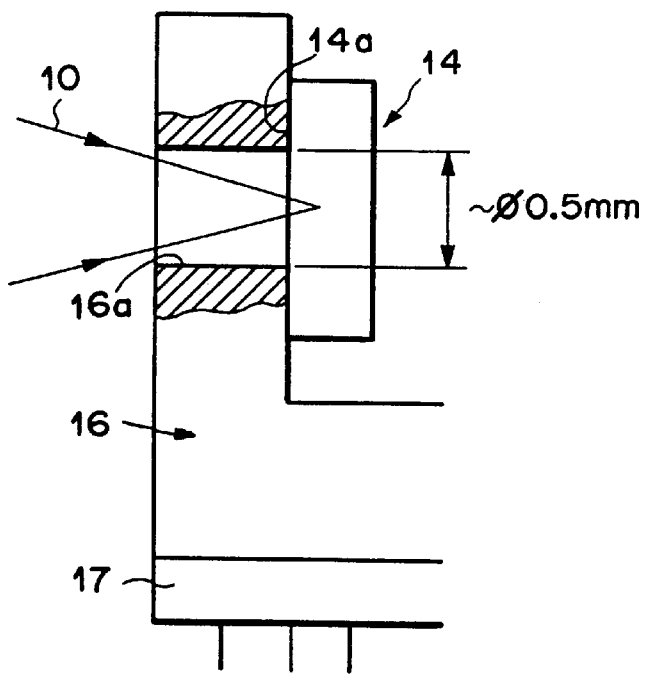
FIG. 3 is a view similar to FIG. 2 but showing a part of a semiconductor-laser-pumped solid state laser in accordance with a second embodiment of the present invention.

The through hole 16a may be uniform in inside dimensions through out its length as in the second embodiment shown in FIG. 3. Even in this embodiment, heat is efficiently dissipated from the Nd:YVO$_4$ crystal 14 by virtue of the fact that the pumping light incident end face 14a of the crystal 14 is fixed to the holder 16.

Figure 4:
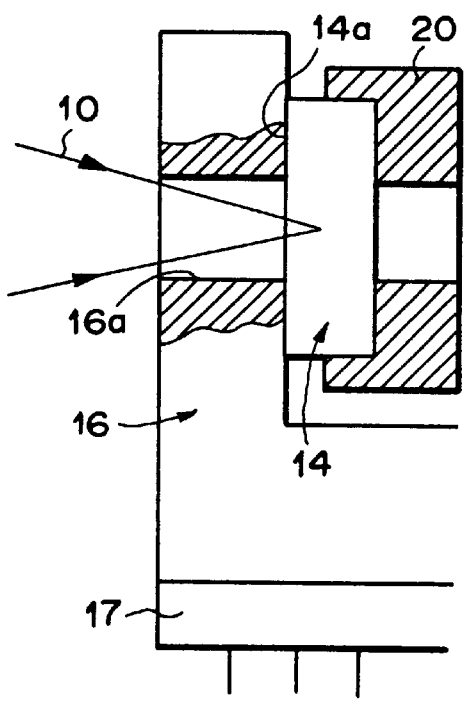
FIG. 4 is a view similar to FIG. 2 but showing a part of a semiconductor-laser-pumped solid state laser in accordance with a third embodiment of the present invention.

A third embodiment of the present invention will be described with reference to FIG. 4, hereinbelow. Also in this embodiment, the pumping light incident end face 14a of the Nd:YVO$_4$ crystal 14 is fixed to the holder 16, whereby heat is effectively dissipated from the Nd:YVO$_4$ crystal 14 through the holder 16.

In this particular embodiment, the end face 14b of the Nd:YVO$_4$ crystal 14 opposite to the pumping light incident end face 14a is in contact with a heat dissipation plate 20, whereby heat is dissipated also through the heat dissipation plate 20 and heat dissipation effect is further enhanced.

Figure 5:
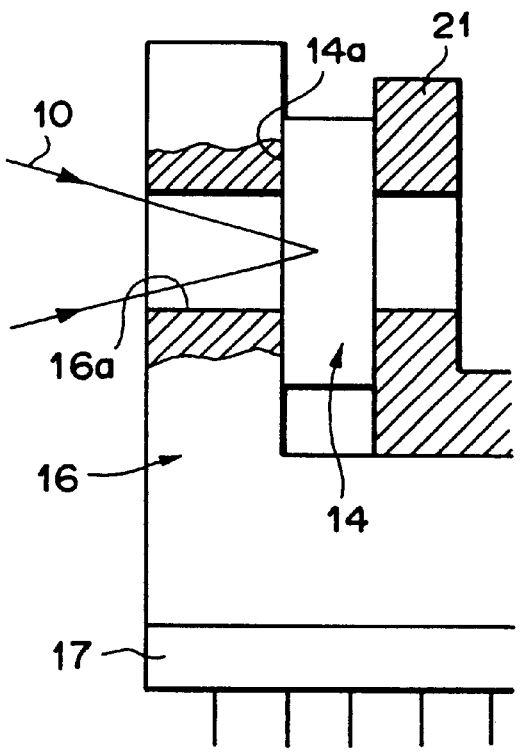
FIG. 5 is a view similar to FIG. 2 but showing a part of a semiconductor-laser-pumped solid state laser in accordance with a fourth embodiment of the present invention.
Figure 6A:
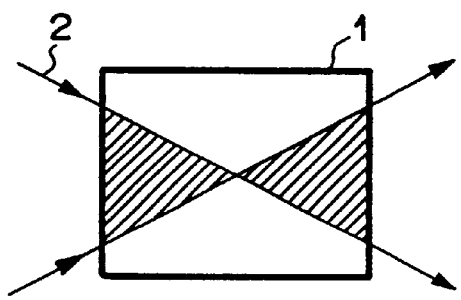
FIGS. 6A and 6B are views for illustrating the problem of heat generation in the solid state laser medium.
Figure 6B:
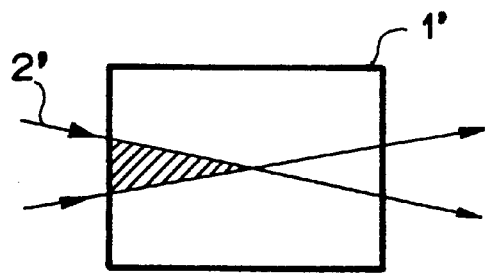

A fourth embodiment of the present invention will be described with reference to FIG. 5, hereinbelow. Also in this embodiment, the end face 14b of the Nd:YV0$_4$ crystal 14 opposite to the pumping light incident end face 14a is in contact with a heat dissipation plate 21. The heat dissipation plate 21 in this embodiment is substantially L-shaped in cross-section and is fixed to the holder 16. With this arrangement, the dissipation plate 21 is cooled by the Peltier element 17 through the holder 16, whereby heat is excellently dissipated through the end face 14b.

Though, in the embodiments described above, a Nd:YVO$_4$ crystal is employed as the solid state laser medium, the present invention may be applied to semiconductor-laser-pumped solid state lasers in which other solid state laser media such as an Er:YVO$_4$ crystal which are high in pumping beam absorption efficiency are employed.

Further the present invention may be applied to wavelength-conversion type semiconductor-laser-pumped solid state lasers in which a solid state laser beam is caused to enter a nonlinear optical element and a laser beam of a shorter wavelength such as its second harmonic is obtained.

We claim:

1. A semiconductor-laser-pumped solid state laser comprising:
   a solid state laser medium doped with a rare earth element;
   a semiconductor laser which emits a pumping laser beam for pumping the solid state laser medium; and
   a holder, wherein a pumping light incident side end face of the solid state laser medium is bonded to a first side of said holder and wherein the holder is provided with a through hole from the first side of said holder to a second side of said holder through which the pumping laser beam impinges upon the pumping light incident side end face of the solid state laser medium, and wherein said through hole has a first cross-sectional area on the first side of said holder and a second cross-sectional dimension different from the first cross-sectional area on the second side of said holder.

2. A semiconductor-laser-pumped solid state laser as defined in claim 1 wherein the through hole is substantially circular in cross-section and wherein an inner diameter of the through hole converges toward the solid state laser medium.

3. A semiconductor-laser-pumped solid state laser as defined in claim 2, wherein the cross-sectional area of said through hole changes step-wise from the first end of the holder to the second end of the holder.

4. A semiconductor-laser-pumped solid state laser as defined in claim 2, wherein the cross-sectional area of said through hole changes continuously from the first end of the holder to the second end of the holder.

5. A semiconductor-laser-pumped solid state laser as defined in claim 1 in which the holder comprises a metal.

6. A semiconductor-laser-pumped solid state laser as defined in claim 1 in which said solid state laser medium comprises at least one of Nd:YVO$_4$ and Er:YAG.

7. A semiconductor-laser-pumped solid state laser as defined in claim 1, wherein the cross-sectional area of said through hole changes step-wise from the first end of the holder to the second end of the holder.

8. A semiconductor-laser-pumped solid state laser as defined in claim 1, wherein the cross-sectional area of said through hole changes continuously from the first end of the holder to the second end of the holder.

9. A semiconductor-laser-pumped solid state laser comprising a solid state laser medium doped with a rare earth element and a semiconductor laser which emits a pumping laser beam for pumping the solid state laser medium, and further comprising a holder wherein a pumping light incident side end face of the solid state laser medium is bonded to a first side of said holder and wherein the end face of the solid state laser medium opposite to the pumping light incident end face is in contact with a heat dissipation plate.

10. A semiconductor-laser-pumped solid state laser as defined in claim 4 in which the heat dissipation plate is in contact with a cooling element directly.

11. A semiconductor-laser-pumped solid state laser as defined in claim 10 in which the holder is cooled by a cooling element and the heat dissipation plate is in contact with the cooling element directly.

12. A semiconductor-laser-pumped solid state laser as defined in claim 10 wherein the holder is cooled by a cooling element and the heat dissipation plate is in contact with the cooling element by way of a member which is high in heat conductivity.

13. A semiconductor-laser-pumped solid state laser as defined in claim 9 wherein the heat dissipation plate is in contact with a cooling element by way of a member which is high in heat conductivity.

14. A semiconductor-laser-pumped solid state laser comprising:
   a solid state laser medium doped with a rare earth element;
   a semiconductor laser which emits a pumping laser beam for pumping the solid state laser medium; and
   a holder, wherein a pumping light incident side end face of the solid state laser medium is bonded to a first side of said holder and wherein the holder is provided with a through hole from the first side of said holder to a second side of said holder through which the pumping laser beam impinges upon the pumping light incident side end face of the solid state laser medium, and wherein said through hole has a first cross-sectional area on the first side of said holder and a second cross-sectional dimension different from the first cross-sectional area on the second side of said holder;

wherein the through-hole hole is formed to have a cross-sectional size large enough such that the inner surfaces of said through hole do not reflect the pumping beam.

15. A semiconductor-laser-pumped solid state laser as defined in claim 14 wherein the through hole is substantially circular in cross-section and wherein an inner diameter of the through hole converges toward the solid state laser medium.

16. A semiconductor-laser-pumped solid state laser as defined in claim 14 wherein the end face of the solid state laser medium opposite to the pumping light incident end face is in contact with a heat dissipation plate.

17. A semiconductor-laser-pumped solid state laser as defined in claim 16 in which the heat dissipation plate is in contact with a cooling element directly.

18. A semiconductor-laser-pumped solid state laser as defined in claim 17 in which the holder is cooled by a cooling element and the heat dissipation plate is in contact with the cooling element directly.

19. A semiconducter-laser-pumped solid state laser as defined in claim 14 in which the holder comprises a metal.

20. A semiconductor-laser-pumpeded solid state laser as defined in claim 14 in which said solid state laser medium cmprises at least one of Nd:YVO$_4$ and Er:YAG.

* * * * *